Patented Oct. 26, 1937

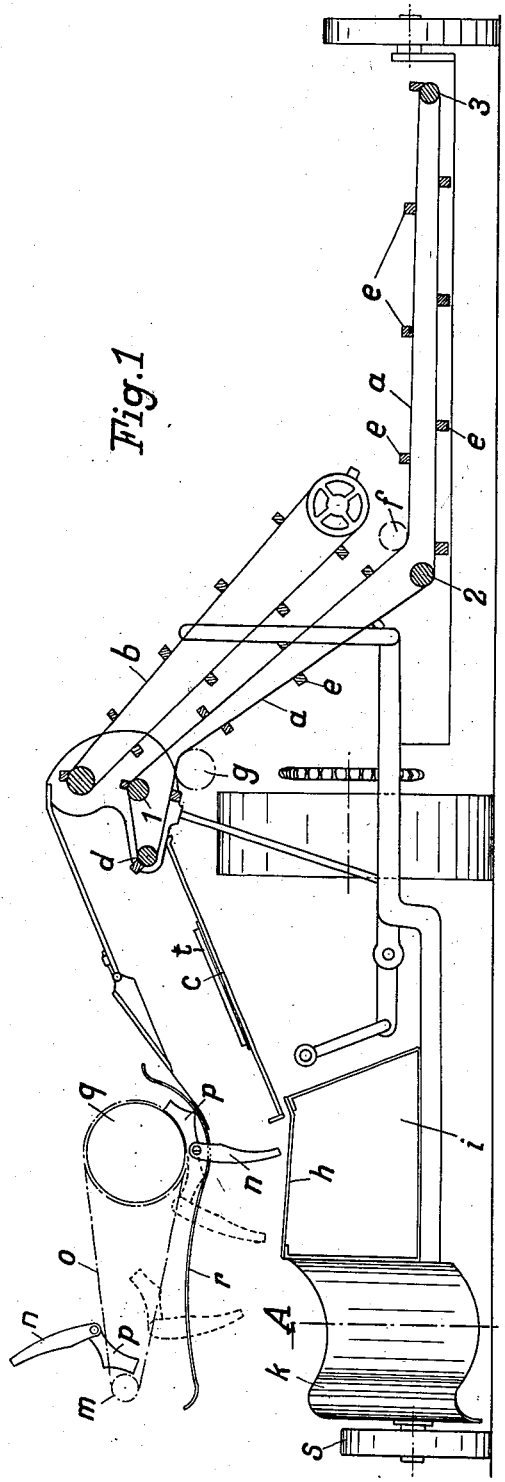

2,096,974

UNITED STATES PATENT OFFICE 2,096,974

REAPING MACHINE

Martin Rausch, Striegau, Germany

Application October 22, 1935, Serial No. 46,085
In Germany October 24, 1934

6 Claims. (Cl. 56—131)

This invention relates to a combination reaper and binder.

In the known machines of this kind the cut grain is brought from the platform arranged behind the cutting blade and formed by a horizontally rotating conveyor cloth between two elevators also consisting of rotary conveyor cloths and over a rotating intermediate roller to the binding table. This construction is open to the objection that considerable quantities of grains thrown out by the violent motion of the plants drop through the spaces between the top reversing roller of the lower elevator and the intermediate roller and also between the latter and the binding table on the ground and are lost. These losses are increased still more, if, as is usually the case, the platform conveyor and the lower elevator consist of two separately rotating cloths forming another space between them. Additional losses are caused by the known reaping and binding machines on the binding table and during removal of the sheaves from the table by the usual ejectors. The known grooved grain catchers disposed under the ejector are unable to overcome this drawback, as the sheaves are conveyed too fast by the existing ejectors over and past the grain catcher, so that there is not time enough for the grains to drop into the catcher. Besides causing a loss of grains, the existing harvesters suffer also from the drawback that a large number of weed seeds are transmitted to the fields and reduce the yield thereof.

The invention aims at avoiding these drawbacks by preventing not only the loss of the grains dropping on the field during conveyance of the plants from the platform to the binding table but also by separating the bound sheaves in a careful manner from the table and bringing them on the field without loss.

To attain its object the invention provides for the arrangement of the lower elevator combined in known manner with the platform conveyor to form a self-contained endless conveyor in such a way that it will overlap the upper edge of the binding table and thus cover the gap between it and the table. This can preferably be effected by means of an additional upper reversing roller or the like which guides the conveyor up to the top of the binding table. In this way grains dropping out cannot reach the field but are brought by the conveyor on the binding table whence they can pass into a collector. Furthermore, instead of the usual ejecting device for the tied sheaves an ejector is provided which causes the sheaves first to be intermittently placed on the upper sieve grate of a grain catcher and shortly afterwards, when the grains suspended within the sheaf have been loosened by the shaking motion of the machine due to moving and have dropped into the catcher, to be carefully brought from the sieve grate over a slide inclined in a direction opposite to the direction of motion onto the ground. To avoid the loss of grains it is important that the arms of the ejector do not drop the tied sheaves by jerks on the slide but convey them thereon free from shocks and vibration. For this reason the invention provides that the ejector arms are guided by means of curves etc. so that they during removal of the sheaves from the grain catcher to the field or the slide inclined towards the latter first advance with their free ends and then as soon as they pass over the outer edge of the grain catcher swing back oppositely to their direction of motion to release the sheaves. In this manner the sheaves are prevented from sticking first to the ejector arms and then dropping from a certain height, which always involves a considerable loss of grains and constitutes a defect.

Finally, to keep the grains dropping on the binder table from passing to the ground through the slits provided in the table for the knotting tools and packing arms the edges of these slits are provided all around with upwardly extending borders, so that the grains slide on the binder table downwardly to the catcher.

One embodiment of the invention is illustrated in the accompanying drawing, in which Fig. 1 is a cross section of a combination reaper and binder, Fig. 2 a longitudinal section of the slide for the sheaves on the line A—A of Fig. 1, and Fig. 3 a cross section of the slotted top of the binder table.

Referring to the drawing, the conveyor $a$ for the cut grain is, according to the invention guided without interruption under the two elevators $b$ to the binder table $c$, and for this purpose an intermediate roller $d$ arranged above the upper edge of the binder table $c$ is provided in the construction shown. The conveyor may for instance comprise two endless chains connected by the cross bars $e$ and a conveyor cloth secured below them, and driven at one or several reversing points $f$, $g$, $1$, $2$, $3$ by sprockets. The sprockets at the reversing point $f$ are disposed outside the conveyor cloth whereas the other sprockets can be connected by shafts which, simultaneously, serve as guide rollers for the conveyor cloth. Instead of the rollers and sprockets angular guide rails arranged within the conveyor cloth and known for similar purposes may be provided at the reversing point 2, f and g. In the continuous conveyor a the cross bars 2 may be relatively high to avoid loss producing accumulations of grain at the point of transition from the platform to the elevator and to insure a steady flow to the binder table. Grains dropping out of the plants are without exception conveyed by the conveyor a to the binder table c whence they slide onto the surface of a grain catcher which is formed of grate bars h extending transversely to the direction of motion of the machine or parallel to the motion of the sheaves, and are collected. Grains dropping out when the sheaves are separated from the binder table cannot pass to the ground, as the sheaves are first conveyed to the sieve grate of the catcher l and only after the lopp grains have dropped into the catcher i owing to the shaking motion of the machine, which takes place while the next sheaf is made ready, move to the ground free from shocks over the inclined slide k. For this reason, the invention provides a novel ejector m which comprises the chains o intermittently rotated by known means, such as shown in American Patent No. 1,179,410 in ejecting direction in cooperation with the knotting device and each provided with two or more successively spaced arms n which are flexible within limits. The ejector arms n are guided by means of the curves p and guide discs q in such a way that during the removal of the sheaves from the sieve grate of the catcher i their free ends lead at first, but as soon as they pass over the outer edge of the catcher swing back oppositely to their direction of motion in slits of a plate r. In this way the sheaves pass perfectly free from shocks to the trough k disposed on the delivery side of the catcher i and inclined oppositely to the direction of motion and thence glide to the ground. On the outside of the trough k a supporting wheel s is preferably provided. To prevent grains from dropping to the ground through the passages for the knotting members and packing arms in the binder table c, the passages have upright borders t.

What I claim, is:

1. In a combination reaper and binder a platform conveyor for receiving the cut grain, an upper elevator, a lower elevator combined with said platform conveyor to form a self-contained endless reversible conveyor unit, driving means for said conveyor, a binder table to which the grain is passed by said conveyor and which is provided with slots for the passage of knotting tools and reversing means for said conveyor, the extreme one of said reversing means being positioned above the binder table to cause said lower elevator to overlap the upper edge of the table and thus bridge the space between said table and lower elevator.

2. In a combination reaper and binder a platform conveyor for receiving the cut grain, an upper elevator, a lower elevator combined with said platform conveyor to form a self-contained endless reversible conveyor unit, driving means for said conveyor, a binder table to which the grain is passed by said conveyor and which is provided with slots for the passage of knotting tools, reversing means for said conveyor, the extreme one of said reversing means being positioned above the binder table to cause said lower elevator to overlap the upper edge of the table and thus to bridge the space between said table and lower elevator, a grain catcher on the delivery side of the table, a plurality of grate bars forming the surface of said catcher and extending in the direction of removal of the bound sheaves, and a sheaf ejector having means for moving the bound sheaves first onto said grate bars and subsequently from said grate bars to the ground.

3. In a combination reaper and binder according to claim 2 chains forming the ejector and rotating in ejecting direction and a plurality of successively spaced arms for each chain.

4. In a combination reaper and binder according to claim 2 chains forming the ejector and rotating in ejecting direction, a plurality of successively spaced arms for each chain, and guiding means for said arms causing the free end thereof to lead first during removal of the sheaves from the catcher to the ground and then to swing back oppositely to their direction of motion after passing beyond the outer edge of the catcher to release the sheaves.

5. In a combination reaper and binder according to claim 2 a slide on the delivery side of the machine inclined opposite to the direction of motion thereof for passing the sheaves to the ground without shocks.

6. In a combination reaper and binder according to claim 2 upright bordering means surrounding the slots in the binder table.

MARTIN RAUSCH.